(12) United States Patent
Fossum et al.

(10) Patent No.: US 7,345,687 B2
(45) Date of Patent: Mar. 18, 2008

(54) ADAPTIVE SAMPLING OF A STATIC DATA SET

(75) Inventors: Gordon Clyde Fossum, Austin, TX (US); Barry Minor, Austin, TX (US); VanDung Dang To, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 270 days.

(21) Appl. No.: 11/204,423

(22) Filed: Aug. 16, 2005

(65) Prior Publication Data

US 2007/0075994 A1 Apr. 5, 2007

(51) Int. Cl.
*G06T 15/10* (2006.01)
(52) U.S. Cl. ...................................... 345/427
(58) Field of Classification Search ............ None
See application file for complete search history.

(56) References Cited

U.S. PATENT DOCUMENTS

| | | | | |
|---|---|---|---|---|
| 4,682,160 A | * | 7/1987 | Beckwith et al. ............ 345/421 |
| 5,355,442 A | * | 10/1994 | Paglieroni et al. ........... 345/427 |
| 6,862,025 B2 | * | 3/2005 | Buehler ..................... 345/424 |
| 6,970,164 B1 | * | 11/2005 | Vincent et al. ............. 345/421 |
| 7,133,041 B2 | * | 11/2006 | Kaufman et al. ........... 345/419 |
| 7,170,514 B2 | * | 1/2007 | Vincent et al. ............. 345/421 |
| 2007/0040833 A1 | * | 2/2007 | Buyanovski ................ 345/426 |

OTHER PUBLICATIONS

Luiz Carlos Guedes, Marcelo Gattass, Paulo Cezar Carvalho, Real-Time Rendering of Photo-Textured Terrain Height Fields, Oct. 14, 1997, Proceedings of Brazilian Symposium on Computer Graphics and Image Processing, p. 18-25.*
Cheol-Hi Lee and Yeong Gil Shin, "A Terrain Rendering Method Using Vertical Ray Coherence," 1997, The Journal of Visualization and Computer Animation, vol. 8, Issue 2, p. 97-114.*
U.S. Appl. No. 10/875,946, filed Jun. 24, 2004, Fossum et al.

\* cited by examiner

*Primary Examiner*—Ulka Chauhan
*Assistant Examiner*—Jason M Repko
(74) *Attorney, Agent, or Firm*—Duke W. Yee; Cas K. Salys; Gerald H. Glanzman

(57) ABSTRACT

A sampling module is provided. Two or more rays are cast onto a surface from a single point of origin. The ray or rays intersect the surface at various locations. The distance between the intersection points of each pair of adjacent rays is calculated. This distance is the current sample density. The current sample density is compared to the desired sample density. If the current sample density is not equal to the desired sample density then the sample density of the next casting of rays is adjusted accordingly.

7 Claims, 4 Drawing Sheets

ADAPTIVE SAMPLING OF A STATIC DATA SET

BACKGROUND OF THE INVENTION

1. Field of the Invention

This invention relates generally to the gathering of data, and, more particularly, to a method, computer program product and apparatus for applying adaptive sampling techniques to a static data set.

2. Description of the Related Art

Many situations are present that require the sampling of data such as terrain mapping, digitizing models, and any situation that requires ray tracing or casting. Often the data sets being sampled are static. In many cases, once the information gathered has been analyzed, it may be necessary to adjust the sample density and modify the number of samples being gathered based on the area of coverage being sampled in order to avoid over or under sampling.

Under sampling often manifests as "sparkles" in a reconstructed image. Prior solutions have been simply to arbitrarily adjust the sampling density and take more samples and repeat this process until finally the desired density is achieved. But these solutions have the drawback of being inefficient and time consuming.

Therefore it would be advantageous to have an improved method, computer program product and apparatus for applying adaptive sampling techniques to a static data set.

SUMMARY OF THE INVENTION

The present invention provides a method, system, and computer program product for adaptively sampling static data sets. Two or more rays are cast onto a surface from a single point of origin. The ray or rays intersect the surface at various locations. The distance between the intersection points of each pair of adjacent rays is calculated. This distance is the current sample density. The current sample density is compared to the desired sample density. If the current sample density is not equal to the desired sample density then the sample density of the next casting of rays is adjusted accordingly.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
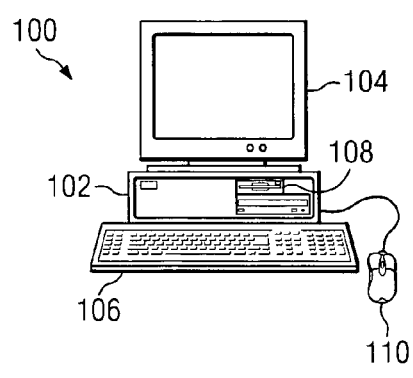
FIG. 1 is a pictorial representation of a data processing system in which aspects of the present invention may be implemented.
Figure 2:
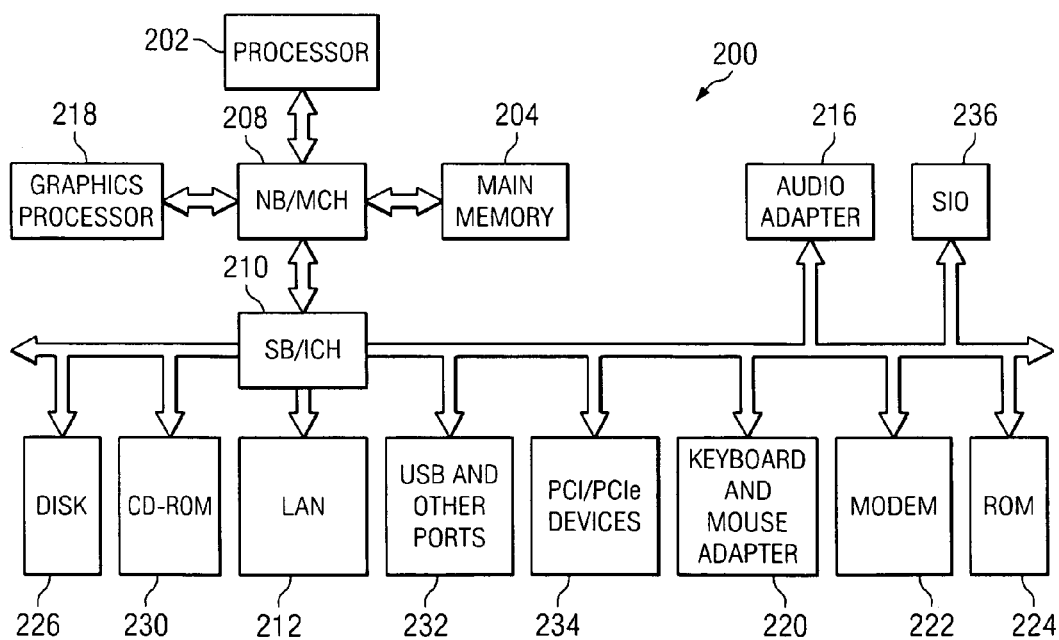
FIG. 2 is a block diagram of a data processing system in which aspects of the present invention may be implemented.

FIGS. 1-2 are provided as exemplary diagrams of data processing environments in which exemplary aspects of the present invention may be implemented. It should be appreciated that FIGS. 1-2 are only exemplary and are not intended to assert or imply any limitation with regard to the environments in which the present invention may be implemented. Many modifications to the depicted environments may be made without departing from the spirit and scope of the present invention.

With reference now to the figures and in particular with reference to FIG. 1, a pictorial representation of a data processing system in which the aspects of the present invention may be implemented. Computer 100 includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or INTELLISTATION computer, which are products of International Business Machines Corporation, located in Armonk, N.Y. Although the depicted representation shows a computer, other embodiments of the present invention may be implemented in other types of data processing systems, such as a network computer, notebook computer, handheld, gaming platform, graphical processing system, medical and digital imaging systems, and oil and gas seismic workstations. Computer 100 also preferably includes a graphical user interface (GUI) that may be implemented by means of systems software residing in computer readable media in operation within computer 100.

With reference now to FIG. 2, a block diagram of a data processing system is shown in which aspects of the present invention may be implemented. Data processing system 200 is an example of a computer, such as computer 100 in FIG. 1, in which code or instructions implementing the processes of the present invention may be located. In the depicted example, data processing system 200 employs a hub architecture including a north bridge and memory controller hub (MCH) 208 and a south bridge and input/output (I/O) controller hub (ICH) 210. Processor 202, main memory 204, and graphics processor 218 connect to MCH 208. Graphics processor 218 may connect to the MCH through an accelerated graphics port (AGP), for example.

In the depicted example, local area network (LAN) adapter 212, audio adapter 216, keyboard and mouse adapter 220, modem 222, read only memory (ROM) 224, hard disk drive (HDD) 226, CD-ROM drive 230, universal serial bus (USB) ports and other communications ports 232, and PCI/PCIe devices 234 connect to ICH 210. PCI/PCIe devices may include, for example, Ethernet adapters, add-in cards, PC cards for notebook computers, etc. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be connected to ICH 210.

An operating system runs on processor 202 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

Instructions for the operating system, the object-oriented programming system, and applications or programs are located on storage devices, such as hard disk drive 226, and may be loaded into main memory 204 for execution by processor 202. Processor 202 performs the processes of the present invention using computer implemented instructions, which may be located in a memory such as, for example, main memory 204, read only memory 224, or in one or more peripheral devices.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

As some illustrative examples, data processing system 200 may be a personal digital assistant (PDA), which is configured with flash memory to provide non-volatile memory for storing operating system files and/or user-generated data. A bus system may comprise one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 204 or a cache such as found in MCH 208. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

In an exemplary embodiment of the present invention, there is a height map and a point of origin. A series of rays will be computed or "cast" from the point of origin to the height map. Rays may be cast in groups of two or more. The angles between each pair of adjacent rays within a single casting are roughly equivalent to one another. In other words, the angle between rays 1 and 2 is approximately the same as the angle between rays 2 and 3 and 3 and 4, etc. The rays will intersect the height map at some point. The intersection, along with its corresponding information, is communicated back to the casting program.

Casting a ray involves computing the height value of each point along the path. The height value of each point is then compared to the height value of the nearest data point of the terrain map. If the height value of the ray point is lower than the height value of the nearest data point of the terrain map, a possible intersection is indicated and more careful calculations are then performed to confirm whether an intersection point has occurred.

The location of the intersection point of a ray is compared to the location of the intersection point of the preceding, adjacent ray. This comparison is used to determine the current sample density and to determine if the sample density of the next casting of rays should be altered. Ideally, the intersections should occur one unit of "desired sample density" from the previous, adjacent ray. For implementations wherein the rays are cast in an approximately linear manner, one unit of "desired sample density" is measured in the direction of the major axis only. In other implementations, one unit of "desired sample density" is measured in three dimensions.

One unit of "desired sample density" will vary depending upon the implementation. For example, a height map of a ten kilometer by ten kilometer piece of terrain may have a desired sample density of one point every ten meters. Therefore, if two adjacent rays intersect the height map at a distance of only three meters apart, the data is being sampled too densely and unnecessary resources are being spent on gathering, collating, analyzing and storing unnecessary data. Conversely, if two adjacent rays intersect the height map at a distance of thirty meters apart, then the map is being sampled too sparsely and valuable, necessary data may be missed.

The location of the furthest point reached by the last ray of the packet of rays is tracked. This location is used as a starting point for the next casting of rays. This point is used to create an imaginary vertical line. Calculations for the next casting of rays start at this vertical line. The point of origin remains the same for the next casting of rays as the current casting of rays. However, as there is no chance of the rays intersecting the terrain map prior to the rays crossing this imaginary vertical line, computation of the rays' path does not begin until this point. This saves on time and CPU usage.

As the point of origin and the location of this imaginary vertical line are known, the points at which each ray of the next casting of rays will intersect the imaginary line can be calculated. The rays are then cast from these points and their paths are calculated until they intersect the terrain map. The intersection points, along with their corresponding information, are communicated back to the casting program. These steps are repeated until the entire area to be sampled, has been sampled.

Other exemplary aspects of the present invention include an upper and a lower threshold value. The threshold values, which vary with the particular implementation, are proportional to the desired sample density and cause the angle between adjacent rays to be either halved or doubled, automatically, for the next casting of rays. For example, an implementation may include an upper threshold value set at two. Therefore, if the current sample density is more than twice the desired sample density, the angle between adjacent rays is automatically halved for the next casting of rays. Similarly, an implementation may include a lower threshold value set at one-half. Therefore, if the current sample density is less than half the desired sample density, the angle between adjacent rays is automatically doubled for the next casting of rays. Other implementations may include both a lower and an upper threshold value.

In another embodiment, the angle spanned by the next packet of rays to be cast may be calculated automatically. X represents the angle spanned by the current packet of rays. R represents the ratio of the number of data samples covered by the angle of the current packet of rays divided by the number of rays in the packet. Therefore, the angle spanned by the next packet of rays to be cast is calculated as X/R.

An alternative embodiment may apply to area sampling. For example, cast a set of rays through a pixel. The set of rays are intended to "cover" the pixel. The locations on the surface where the rays intersect are computed. By some method, which is dependent upon the particular implementation, calculate a "ratio" of the "area" represented by this pattern, divided by the number of rays cast through this pixel. Another way to express the "area" covered or represented by the pattern is as the number of discreet samples contained within the pattern. The "ratio" is the number of discreet samples covered by the current casting of rays divided by the number of rays cast. The desired sample density is what, ideally, this "ratio" should be. If this "ratio" is deemed to be too large in comparison to the desired sample density, then more rays could be sent through the next pixel. If the "ratio" is deemed to be too small in comparison to the desired sample density, then fewer rays could be sent through the next pixel. The determination of "too large" and "too small" as well as the particulars of the mathematics involved are dependent upon the particular implementation.

Depending on the implementation, adjustments to the sample density may be made only going forward. That is, only the next casting of rays is adjusted based on the analysis of the sample density of the current casting, rather than re-sampling the current data set. In other implementations, it may be necessary to "back-up" and re-sample the current data set by casting more rays using the improved sampling density information to better cover the current data set.

Figure 3:
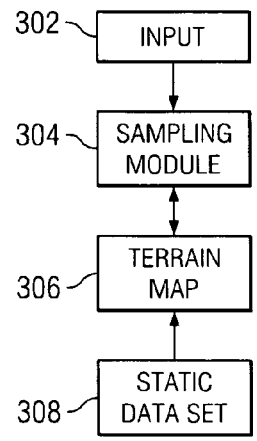
FIG. 3 is a block diagram illustrating a system for adaptively sampling a static data set, in accordance with an illustrative embodiment of the present invention.

FIG. 3 is a block diagram illustrating a system for adaptively sampling a static data set. Sampling module 304 may be implemented as either software, hardware or any combination thereof. Sampling module 304, which may be implemented as data system 200 in FIG. 2, receives input 302. Input 302 may originate from an external source or an internal source. Some examples of typical inputs received by the sampling module 304 include, but are not limited to, number of rays to be cast, initial angle of rays to be cast, instructions for how to traverse the surface to be sampled, and the location of the origin point for rays to be cast. Sampling module 304 casts two or more rays onto a surface, such as terrain map 306. Terrain map 306 includes many static data sets 308. When sampling module 304 casts two or more rays onto terrain map 306, sampling module 304 receives the point, or points, at which the ray, or rays, intersect the terrain map along with its corresponding information.

Figure 4:
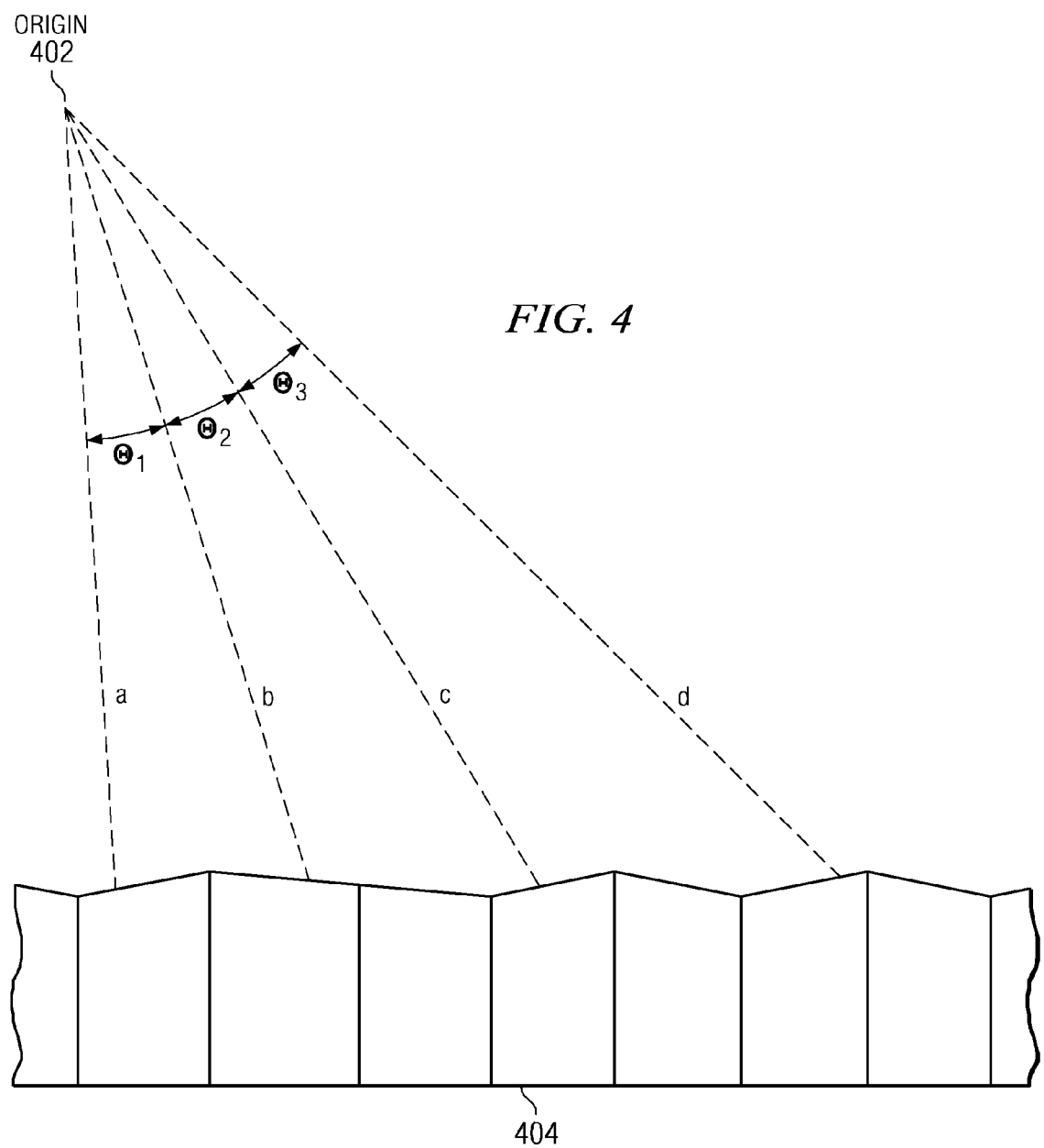
FIG. 4 is a pictorial representation of sampling a terrain map, in accordance with an illustrative embodiment of the present invention.

FIG. 4 is a pictorial representation of sampling a terrain map, in accordance with an illustrative embodiment of the present invention. Rays a, b, c, and d are cast from origin 402. Rays a, b, c, and d intersect terrain map 404 at various locations. Terrain map 404 is a cross sectional view of a terrain map. A single plane, which is perpendicular to terrain map 404, contains rays a, b, c, and d and origin 402. Θ1 is the angle between rays a and b. Θ2 is the angle between rays b and c. Θ3 is the angle between rays c and d. Θ1, Θ2, and Θ3 are approximately the same. In the present example, rays a, b, c, and d intersect terrain map 404 at a distance of one unit of desired sample density apart.

Figure 5:
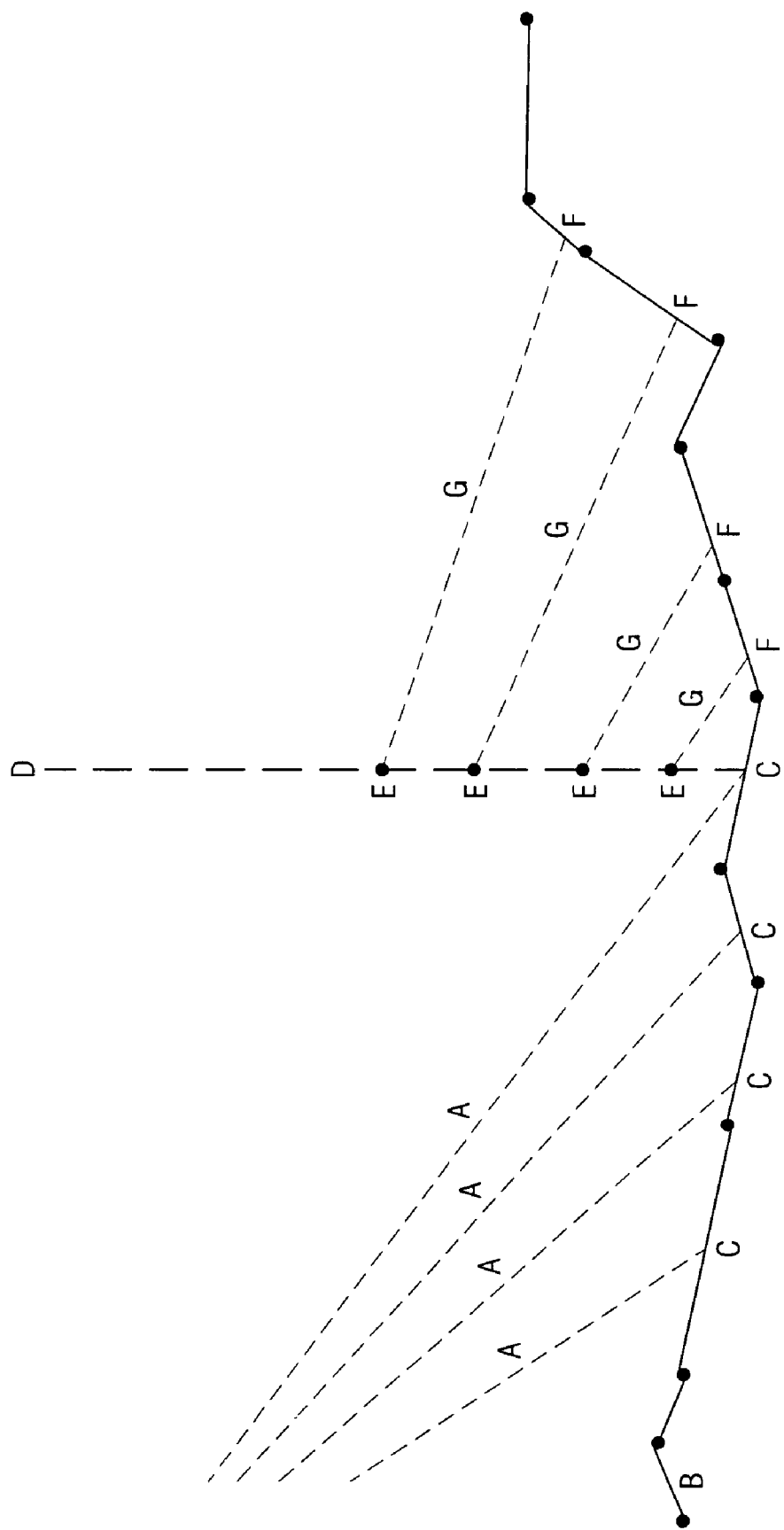
FIG. 5 is a pictorial representation of sampling a terrain map, in accordance with an illustrative embodiment of the present invention.

FIG. 5 is a pictorial representation of sampling a terrain map, in accordance with an illustrative embodiment of the present invention. FIG. 5 is a side view of rays being cast onto a terrain a map. A sampling module, such as sampling module 304 in FIG. 3, first casts ray set A. In a subsequent casting, the sampling module casts ray set G. The subsequent casting occurs following correction of the angle between adjacent rays within the set or cast rays to achieve a desired sample density. The sampling module casts ray set A, which includes four rays in the present example, from a point of origin onto terrain map B. The point of origin is off to the left of the scene and both ray sets, A and G, emanate from it. Ray set A intersects terrain map B at intersection points C.

The sampling module computes the area of terrain spanned by intersection points C, and that area is divided by the number of rays cast to arrive at a ratio.

The sampling module notes the location of the furthest point reached by ray set A. The sampling module establishes imaginary vertical line D at the furthest intersection point reached by ray set A. The sampling module may cast ray set G starting from vertical line D, since there is no chance of a ray from ray set G having an intersection point to the left of vertical line D. The sampling module uses the previously computed ratio to help compute the locations of the starting points E of ray set G on vertical line D.

As the sampling module knows the point of origin and the location of vertical line D, the sampling module can calculate the points at which each ray of ray set G will intersect vertical line D. The sampling module compares the ratio to a desired sample density and determines if the two are approximately equivalent.

If the ratio is large, the sampling module adjusts the angle between the adjacent rays of ray set G so that starting points E are closer together, or are packed more tightly, on vertical line D than they would have been if ray set G had been cast using the same angle between adjacent rays as ray set A used. If the ratio is small, the sampling module adjusts the angle between the adjacent rays of ray set G so that starting points E are spaced farther apart, or are packed less tightly, on vertical line D than they would have been if ray set G was cast using the same angle between adjacent rays as ray set A used.

The sampling module extends the rays connecting the point of origin with starting points E to the right, forming ray set G, which is comprised of four rays in the present example, until ray set G intersects terrain map B at intersection points F. The portion of the rays in ray set G that occur between the point of origin and vertical line D are not computed, thus saving on processor time and memory space. The sampling module repeats this process until the entire area to be sampled has been sampled.

Figure 6:
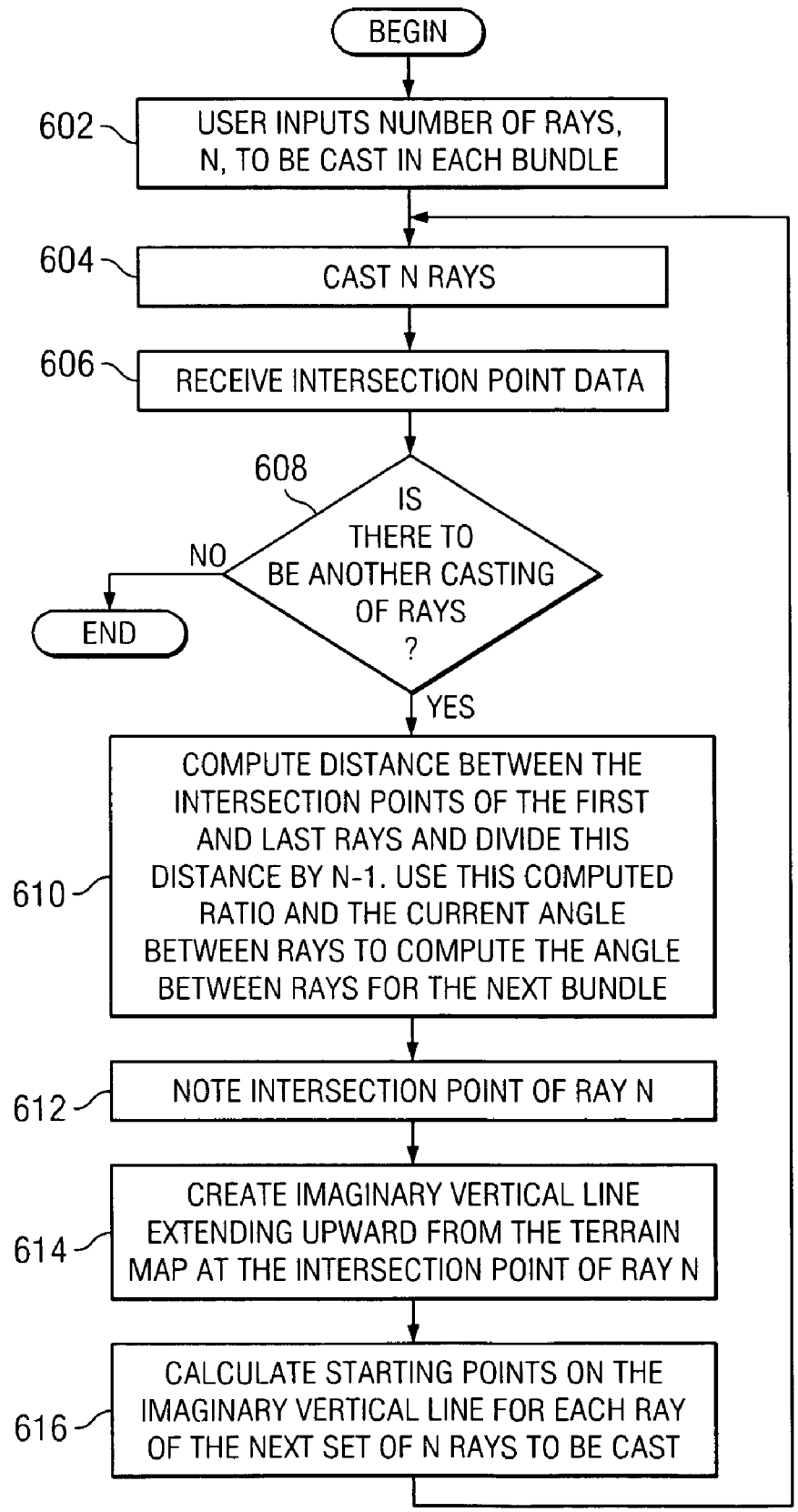
FIG. 6 is a flowchart illustrating operation of a sampling module for adaptively sampling static data sets in accordance with an illustrative embodiment of the present invention.

Turning now to FIG. 6, a flowchart illustrating operation of a sampling module, such as sampling module 304 in FIG. 3, for adaptively sampling static data sets is depicted in accordance with an illustrative embodiment of the present invention. The operation of a sampling module for adaptively sampling static data sets may be implemented in a data processing system, such as data processing system 200 in FIG. 2, or as software or any combination thereof. The operation begins when a user inputs a number of rays, N, to be cast in each bundle (step 602). N rays are cast (step 604). The sampling module receives intersection point data for the cast N rays (step 606).

The sampling module determines if another casting of rays will occur (step 608). If another casting of rays is not going to occur (a no output to step 608), the operation ends. If another casting of rays is going to occur (a yes output to step 608), the sampling module computes the distance between the intersection points of the first and last rays of the set of N rays and divides the distance computed by N−1. The sampling module uses this determined ratio together with the current angle between rays to compute the angle between rays for the next bundle of rays (step 610). The sampling module notes the intersection point of ray N, the farthest intersection point of the set of N rays (step 612). The sampling module creates an imaginary vertical line, extending upward from the terrain point at the intersection point of ray N (step 614). The sampling module calculates the starting point on the imaginary vertical line for each ray of the next set of N rays to be cast (step 616). Repeat step 604.

The invention can take the form of an entirely hardware embodiment, an entirely software embodiment or an embodiment containing both hardware and software elements. In an illustrative embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for adaptively sampling static data sets, the method comprising:
   generating a data representation of a surface of an object;
   casting a plurality of rays onto the data representation of the surface from a single point of origin;
   determining a current sample density based upon intersection points with the data representation of a plurality of adjacent rays;
   comparing the current sample density to a desired sample density to form a comparison; and
   altering a subsequent sample density of a subsequent casting of a subsequent plurality of rays using the comparison, wherein an angle between adjacent rays is altered for the subsequent casting; wherein altering the subsequent sample density of the subsequent casting of the subsequent plurality of rays by altering the angle between the adjacent rays for the subsequent casting comprises:
   dividing an angle spanned by a current casting of the plurality of rays by a ratio, wherein the ratio is a ratio of a number of data samples covered by the angle between adjacent rays spanned by the current casting of the plurality of rays divided by a number of rays cast.

2. The method of claim 1, further comprising:
   designating a set of points that define a vertical line extending upward from the surface at a farthest intersection point;
   calculating starting points for the subsequent casting of the subsequent plurality of rays on the vertical line; and
   casting the subsequent plurality of rays from the starting points on the vertical line.

3. The method of claim 1, wherein the plurality of rays is cast in a plane that contains the single point of origin and the plane is perpendicular to the data representation and wherein the current sample density is a distance between the intersection points with the data representation of two adjacent rays.

4. The method of claim 1, further comprising:
   re-casting the plurality of rays onto the data representation.

5. The method of claim 1, wherein the plurality of rays are cast in three dimensions and wherein the current sample density equals an area covered by the plurality of rays divided by a number of rays cast.

6. The method of claim 5, further comprising:
   responsive to an absence of a determination that the comparison equals one, altering a number of rays to be cast in the subsequent casting of rays.

7. The method of claim 6, wherein the area covered by a current casting of the plurality of rays equals a number of discreet samples covered by the current casting of the plurality of rays and wherein altering the number of rays to be cast in the subsequent casting of the subsequent plurality of rays comprises:
   making the number of rays to be cast in the subsequent casting of the subsequent plurality of rays equal to the number of discreet samples covered by the current casting of the plurality of rays.

* * * * *